April 7, 1925.

R. A. KOTTKE

PAN LIFTER

Filed May 18, 1923

Inventor

Rudolph A. Kottke

By B. J. Wheeler
Attorney

Patented Apr. 7, 1925.

1,532,247

UNITED STATES PATENT OFFICE.

RUDOLPH A. KOTTKE, OF DETROIT, MICHIGAN.

PAN LIFTER.

Application filed May 18, 1923. Serial No. 639,807.

*To all whom it may concern:*

Be it known that I, RUDOLPH A. KOTTKE, a citizen of the United States, residing at Detroit, in the county of Wayne and State of Michigan, have invented a new and useful Pan Lifter, of which the following is a specification.

This invention relates to kitchen utensils and relates particularly to gripping and lifting tongs for handling hot bake pans and the like.

It is the object of the invention to provide a utensil of the specified character, forming the same primarily of wire and utilizing resiliency of the wire to normally maintain the jaws spaced in their initial position of engagement with an article.

In attaining this object, the invention contemplates forming the complete device from two lengths of wire, looped to form co-pivotal portions, and having co-acting handles at one side of said portions and co-acting jaws at the other side thereof, one of the handle portions functioning further as a spring, co-acting with the other handle portion to maintain the proper normal spacing of the jaw portions.

Figure 1:
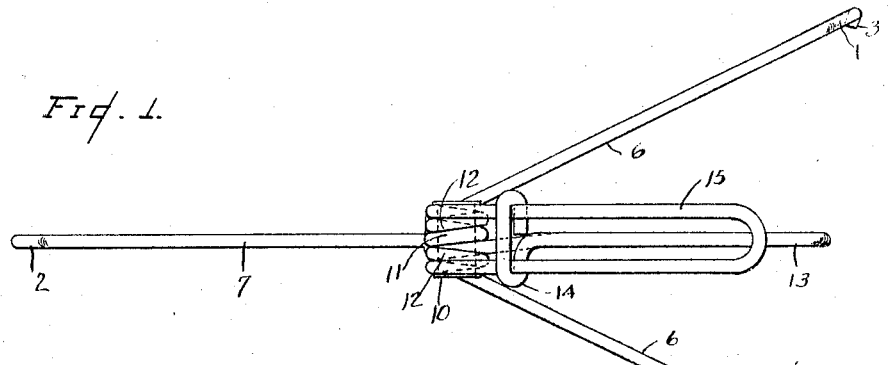

A preferred embodiment of the invention is hereinafter described, and is illustrated in the accompanying drawing, wherein, Fig. 1 is a plan view of the improved device.

Figure 2:
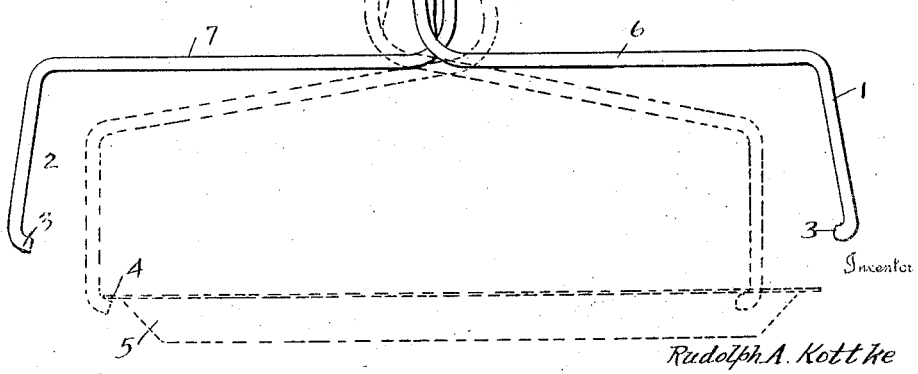

Fig. 2 is a view of the same in side elevation.

In these views the reference character 1 designates a twin pair of jaws formed by the respective end portions of one of the lengths of wire from which the device is formed, and 2 is a complementary jaw formed by an end portion of the other wire. The lower (or free) ends of the jaws 1 and 2 are bent slightly toward each other, as indicated at 3, thus forming seats for engagement beneath the marginal flange 4 of an ordinary bake pan 5 (or similar receptacle). The jaws 1 are down-turned upon divergent arms 6, and the jaw 2 is down-turned upon an arm 7 projecting toward the arms 6 in a direction to substantially bisect the angle between the latter arms. At their inner ends, the arms 6 are bent upwardly and twisted one about the other as indicated at 8. The arm 7, at its inner end, passes freely between the arms 6 and is then also bent upwardly, as indicated at 9. 10 is a tubular pivot member for the arms 6 and 7. The arm 7, at the upper end of its portion 9, is formed with a loop 11 engaging said pivot member; and the twin arms 6, above their inter-twisted portions 8, form loops 12 embracing the pivot member 10 at each side of the loop 11. The ends of the member 10 are up-set or riveted over to hold the loops 11 and 12 in place. Laterally projecting from the pivot member is a return-bent handle 13 integral with the loop 11, the wire forming said handle terminating adjacent the pivot member in a looped keeper 14. Integral with the loops 12 is formed a U-shaped handle 15, passing freely through the keeper 14 and extending normally in a divergent relation to the handle 13 above the latter. The latter acts as a spring tending to maintain the described divergent relation of the handles. Said handles are thus so arranged that they may be both gripped by one hand and pressed toward each other, as for example, to the dash line position shown in Fig. 2. The arms 6 and 7 are thus swung to the divergent relation also indicated in dash lines in said figure and the jaws 1 and 2 are moved toward each other to grip the article 5. Upon release of pressure on the handles, the lower one 13 expands against the upper one 14, swinging the arms 6 and 7 upon their common pivot 10 to again retract the jaws 1 and 2 from each other. The upper handle is transverse to and slightly longer than the lower one, so that the latter may enter the opening of the former, if it be necessary to move the jaws 1 and 2 to a relatively near relation, as when a small sized pan is being gripped.

It is to be noted that the described construction locates the handles a sufficient distance above the jaws as to prevent discomfort to the person using the device due to heat rising from the supported pan and its contents. The use of wire as the material for forming substantially the entire device is conducive to manufacture at low cost. The range of movement of the jaws 1 and 2 toward each other is such as to provide for gripping any standard size of bake-pan.

What I claim is:

1. In a device of the character described, a pivot member, and a pair of gripping members each formed of wire looped to embrace said pivot member, and each forming a handle at one side of its fulcrum and an arm at the other side thereof, said arms terminating in coacting jaws, one of said handles functioning as a spring bearing upon the other handle to urge said gripping members apart.

2. In a device of the character described, a pivot member, and a pair of gripping members each formed of wire looped to embrace said pivot member, and each forming a handle at one side of its fulcrum and an arm at the other side thereof, said arms terminating in coacting jaws, one of said handles functioning as a spring bearing upon the other handle to urge said coacting jaws apart, and one of said handles comprising a keeper through which the other handle freely passes.

3. In a device of the character described, a pair of gripping members each formed of wire and intermediately pivotally connected, said members forming normally divergent handles at one side of their pivotal connection and at the other side thereof forming arms terminating in co-acting jaws, one of said handles having the nature of a spring yieldably bearing upon the other to resist converging movement of the handles.

4. A device as set forth in claim 3, the spring-forming handle being looped adjacent the pivotal connection of the handles to form a keeper loosely engaged by the other handle.

5. In a device of the character described, a pair of gripping members formed of wire and intermediately pivotally connected, said members forming normally divergent handles at one side of their pivotal connection, and one of said members forming at the other side of said connection a pair of divergent arms having terminal jaw portions, the other gripping member forming an arm movable about said pivotal connection in a plane substantially bisecting the angle of divergency of the first mentioned pair of arms and having a direction substantially opposite to the bisector of said angle.

6. A device as set forth in claim 5, one of said handles having the nature of a spring urging said handles to a maximum divergency.

7. A device as set forth in claim 5, the divergent pair of arms having inter-twisted portions transverse to the main bodies of said arms, adjacent the pivotal connection, and the other arms being bent to extend adjacent the pivotal connection in proximity to said inter-twisted portions.

In testimony whereof I sign this specification.

RUDOLPH A. KOTTKE.